US010024491B2

(12) United States Patent
Knickrehm

(10) Patent No.: US 10,024,491 B2
(45) Date of Patent: Jul. 17, 2018

(54) LEAN-TO RIGGING APPARATUS FOR SHAFT INSTALLATION

(71) Applicant: SafeWorks, LLC, Tukwila, WA (US)

(72) Inventor: Morgan Knickrehm, Kalispell, MT (US)

(73) Assignee: Safewworks, LLC, Tukwila, WA (US)

( * ) Notice: Subject to any disclaimer, the term of this patent is extended or adjusted under 35 U.S.C. 154(b) by 0 days.

(21) Appl. No.: 15/195,929

(22) Filed: Jun. 28, 2016

(65) Prior Publication Data
US 2017/0370520 A1    Dec. 28, 2017

(51) Int. Cl.
| | |
|---|---|
| *E04G 1/00* | (2006.01) |
| *F16M 13/02* | (2006.01) |
| *E04G 25/00* | (2006.01) |
| *E04C 3/02* | (2006.01) |
| *B66D 3/26* | (2006.01) |

(52) U.S. Cl.
CPC ............ *F16M 13/022* (2013.01); *B66D 3/26* (2013.01); *E04C 3/02* (2013.01); *E04G 25/00* (2013.01); *E04C 2003/026* (2013.01); *E04G 2025/006* (2013.01)

(58) Field of Classification Search
CPC .......... F16M 13/022; B66D 3/26; E04C 3/02; E04G 25/00
USPC ..... 182/128, 186.9, 113, 115; 187/240, 379, 187/900; 52/125.2, 30, 72, 283
See application file for complete search history.

(56) References Cited

U.S. PATENT DOCUMENTS

| | | | | |
|---|---|---|---|---|
| 8,596,416 | B2 * | 12/2013 | Crew ........................ | E06C 7/12 182/103 |
| 8,646,224 | B2 * | 2/2014 | Wurth ..................... | E04G 21/14 52/125.2 |
| 8,646,576 | B2 * | 2/2014 | Wurth ...................... | E04G 3/24 182/113 |
| 8,813,432 | B2 * | 8/2014 | Wurth ..................... | E04G 21/14 52/73 |

(Continued)

FOREIGN PATENT DOCUMENTS

GB        2161372 A       1/1986

OTHER PUBLICATIONS

International Patent Application No. PCT/US2017/039532; Int'l Search Report and the Written Opinion; dated Sep. 20, 2017; 13 pages.

*Primary Examiner* — Todd M Epps
(74) *Attorney, Agent, or Firm* — Baker & Hostetler LLP

(57) ABSTRACT

A lean-to rigging apparatus is described for installation in a shaft, such as an elevator shaft, having a wall and including at least one sill opposite the wall. The rigging apparatus includes a spanning beam, a sill support structure, a wall support member, and a hoist connector. The sill support structure on a first end of the spanning beam is designed to seat against a sill in the in the shaft while the wall support member on a second end of the spanning beam abuts against the opposite shaft wall. The sill support structure is rigidly connected to the spanning beam in a hingeless configuration and can seat against a sill in a plurality of seating positions. These seating positions allow the rigging apparatus to be positioned in a plurality of angles and therefore to be installed in shafts of different dimensions. The hoist connector is configured to allow a connection to a hoist device for hoisting various materials from one level to another within the shaft.

20 Claims, 6 Drawing Sheets

(56) References Cited

U.S. PATENT DOCUMENTS

| | | |
|---|---|---|
| 2011/0024231 A1 | 2/2011 | Wurth et al. |
| 2014/0054526 A1* | 2/2014 | Kalakay, Jr. ............. B66D 3/26 |
| | | 254/226 |
| 2016/0097484 A1 | 4/2016 | Wurth et al. |

* cited by examiner

LEAN-TO RIGGING APPARATUS FOR SHAFT INSTALLATION

TECHNICAL FIELD

The present disclosure pertains to the field of construction, and more particularly, to a hingeless lean-to rigging apparatus for installation in a shaft and for use in hoisting materials within the shaft during construction.

BACKGROUND

Almost every multi-story structure, such as a commercial building, is built with one or more elevators. Construction of multi-story buildings can be done using a variety of materials and processes. In some cases, build-out of the lower building floors is started prior to the construction of the upper building floors. It is often efficient to begin further construction activities (e.g., running of plumbing pipes, installation of electrical wires, installation of elevator guide rails, etc.) on the lower floors prior to the construction of the upper building floors. However, because the upper floors have not been completed prior to the build-out of lower floors, the elevators within the building are not available for use in transporting construction materials to the upper floors. These construction materials can often be heavy and difficult to move (e.g., pipes, panels, wires, guide rails etc.).

Construction activities may therefore require the transport of heavy materials to building floors above the first floor where elevators cannot be used. In the construction of some buildings, the use of a crane for hoisting heavy construction materials it is not cost-effective or efficient. It also be may be difficult to situate a crane within a crowded building site. As building floors are constructed, elevator shafts are frequently constructed simultaneously.

It would be advantageous to provide a construction apparatus that could be easily used within an elevator shaft for hoisting construction materials to various floors of a structure under construction.

SUMMARY

A lean-to rigging apparatus according to embodiments of the present application comprises a spanning beam, a sill support structure, a wall support member, and a hoist connector. The lean-to rigging apparatus is designed to be installed within a shaft comprising one or more sills and a shaft wall opposite the sills. The sill support structure is rigidly attached to the spanning beam and configured to seat against a sill in the shaft in a plurality of seating positions. The sill support structure can further comprise upper and lower sill support members that can abut against different sides of the sill. The wall support member is configured to abut against the shaft wall positioned opposite the sill. When installed in the shaft, the hingeless rigging apparatus is supported in an inclined position with respect to a horizontal axis.

The hoist connector is rigidly attached to a lower portion of the spanning beam and is configured to connect to a hoist device. The connection may be made through apertures formed in the hoist connector. When installed in a shaft, the rigging apparatus can be used to support a load to be hoisted from one level to another within the shaft by the hoist device.

In one embodiment the shaft is an elevator shaft. A plurality of sills within the shaft, such as the portions of the building floors extending into the elevator shaft, are positioned opposite at least one wall of the elevator shaft. The rigging apparatus can be used to connect to a hoist device during construction of a building, before elevators are installed, to lift building materials from one floor to another within the building structure.

DETAILED DESCRIPTION OF ILLUSTRATIVE EMBODIMENTS

Figure 1:
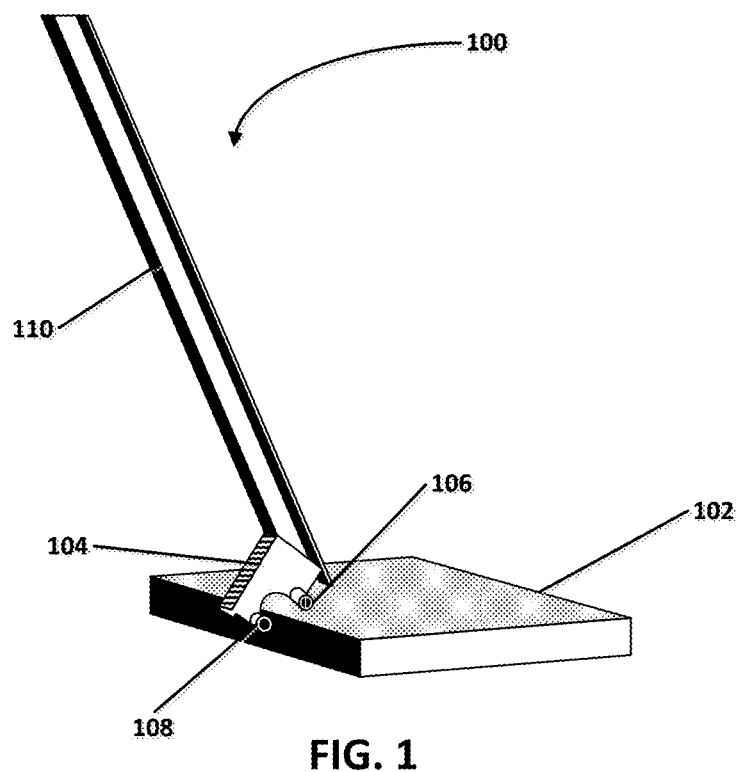
FIG. 1 is a perspective view of one embodiment of a lean-to rigging apparatus for installation into a shaft and showing the sill support structure seated against a sill.

The present application will now be described with occasional reference to the specific embodiments of the application. The subject matter of the present application may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.
}

In accordance with embodiments of the present invention, an apparatus for hoisting materials within a shaft are provided. The term "shaft" as used herein, is defined to mean any vertical space that comprises at least one wall and one sill regardless of whether the shaft is fully enclosed (e.g., as it may not be during construction). Specifically, the term "shaft" includes an elevator shaft, which is the vertical space within which an elevator travels. Although the present disclosure could be utilized in a variety of different shafts, and is not limited to installation in an elevator shaft, specific reference will sometimes be made to installation within an elevator shaft in a structure. Thus, it is to be understood that any reference to an elevator shaft should not be construed as limiting the present disclosure to use in such a space. The term "structure," as used herein, is defined to mean any construction having more than one floor. The term "hoisting", as used herein, is defined as the act of moving objects, groups of objects or materials from one vertical height to another height.

In one embodiment, this description and the accompanying figures disclose apparatus for hoisting construction materials within an elevator shaft. Conventional and well-known techniques may be omitted from this description and are not illustrated. An apparatus as described herein can be used to hoist any material with dimensions that allow it to fit within the elevator shaft. Similar reference numerals will be used to indicate generally similar, and possibly identical, components in each figure.

Referring now to the figures, FIG. 1 illustrates a first embodiment of a lean-to rigging apparatus ("rigging apparatus") 100 for installation and use within a shaft. The rigging apparatus 100 is configured to seat against sill 102 that is within the shaft. Sill 102 may, for example, be a portion of the floor of a building where the floor intersects with an elevator shaft. The building floor and sill may be constructed of reinforced concrete, or may be constructed of another appropriate material or materials, such as for example steel. In the embodiment illustrated in FIG. 1, the sill support structure 104 of the rigging apparatus 100 seats against two different sides of sill 102 that form a corner. However, the sill 102 need not have a rectilinear shape and can comprise other shapes such as, for example, a rounded edge. The sill 102 can also have any desired size or thickness.

The rigging apparatus 100 further comprises a spanning beam 110 having a first end, a second end, and a length. In the embodiment shown in FIG. 1, the spanning beam 110 is a steel "I" beam. However, the spanning beam 110 may be constructed out of any number of materials, so long as they have the requisite strength for supporting loads to be hoisted within the shaft. For example, the spanning beam 110 can be constructed from other materials besides steel such as aluminum. Moreover, the spanning beam 110 can have other cross-sectional shapes, such as, for example, square, rectangular, circular, channel, "H" shape, "L" shape, "T" shape or "W" shape.

Sill support structure 104 is rigidly attached to the first end of the spanning beam 110 and configured to seat against the sill 102 and provide support for the rigging apparatus 100 and maintain the spanning beam 110 at a constant angle. Also illustrated are the upper sill support member 106 and lower sill support member 108, which abut against different sides or portions of the sill 102. The sill support structure 104 is described with more detail below and with reference to FIG. 4.

Figure 2:
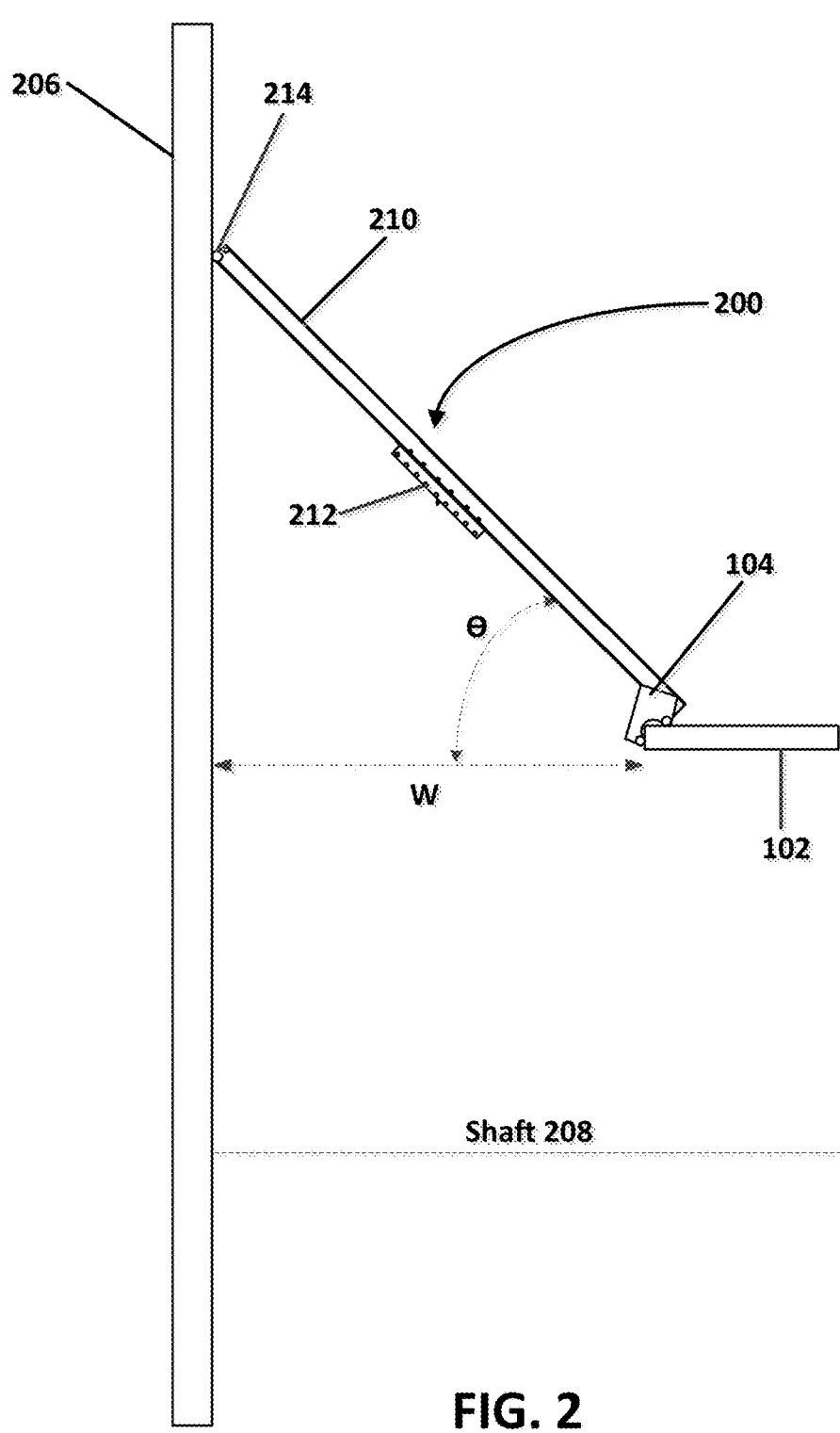
FIG. 2 is a side view of a lean-to rigging apparatus installed in a shaft according to one embodiment of the present disclosure.

FIG. 2 illustrates a side view of another embodiment of a lean-to rigging apparatus 200 installed in shaft 208. Shaft 208 is bounded on one side by shaft wall 206 and contains sill 102 which is opposite shaft wall 206. The right-hand boundary of shaft 208 is depicted for illustrative purposes, although the actual boundary might differ. For purposes of this disclosure, the shaft 208 is defined only to contain the left-hand end portion of the sill 102. Shaft 208 may contain any number of sills 102 positioned opposite the at least one shaft wall 206. For example, a building structure might contain a plurality of different sills 102 located where each building floor intersects the elevator shaft. In such a scenario the rigging apparatus 200 could be seated against any of the plurality of sills. The shaft 208 could be a conventional elevator shaft as known in the art. Moreover, the shaft wall 206 can be constructed of any appropriate material or materials such as, for example, concrete and/or steel, and can have any thickness. In the illustrated embodiment, the shaft wall 206 has no openings along its height. However, the shaft wall 206 can have any desired quantity of openings positioned at any desired location along its height.

The rigging apparatus 200 further comprises a hoist connector 212 arranged on the spanning beam 210. The hoist connector is configured to allow the rigging apparatus 200 to be connected to a hoist device (not pictured). The hoist device can be configured to hoist a load from one vertical height in the shaft (e.g., the ground floor of a building structure) to another height in the shaft (e.g., an upper floor of the building structure). The hoist device may be any suitable mechanism or device, such as an electrical hoist, a manual hoist, a lever hoist, or a chain fall, sufficient to hoist a load from one height in a structure to another height in the structure. The load could be, for example, any construction material, construction tool, or object desired at an upper or lower level of a structure. In one embodiment illustrated in FIG. 2, the hoist connector 212 is a second beam rigidly connected to the spanning beam 210 with a plurality of apertures for supporting a load. The hoist connector 212 is described with more detail below and with reference to FIG. 5.

Also shown is the wall support member 214, which is attached to the second end of spanning beam 210 and configured to abut against shaft wall 206. The wall support member 214 is configured to abut against the shaft wall 206 and provide support for the rigging apparatus 200. The wall support member 214 is described with more detail below and with reference to FIG. 6.

Again with reference to FIG. 2, a horizontal distance W is defined as extending between the edge of the sill 102 and the shaft wall 206. The rigging apparatus 200 is configured to span the horizontal distance W with one end seated against the sill 102 and one end abutting against shaft wall 206 in order to connect to a hoisting device and support a load. The rigging apparatus 200 has a length that is longer than the horizontal distance W between the sill 104 and the shaft wall 206. As such, the rigging apparatus 200 rests in an inclined orientation with respect to a substantially horizontal axis that is perpendicular to the shaft wall 206 and parallel to the major surface of sill 102 (i.e., extending along the line W between the left and right sides of the page in FIG. 2). An angle θ is defined between the horizontal axis and the spanning beam 210. By maintaining the rigging apparatus 200 at an angle θ within the shaft, the rigging apparatus is prevented from falling down the shaft, and the forces from a load are more evenly dispersed throughout the apparatus 200—adding to the strength and load-bearing capabilities.

As explained in more detail with reference to FIG. 4, sill support structure 104 is configured to seat against sill 102 in a plurality of seating positions and provide support to the rigging apparatus. Likewise, the wall support structure 204 is configured to abut against the wall and provide support when the spanning beam 210 is in a plurality of angles θ. This adjustable positioning of the rigging apparatus allows one apparatus to be installed in shafts with differing horizontal distances W between a sill 102 and shaft wall 206.

Figure 3:
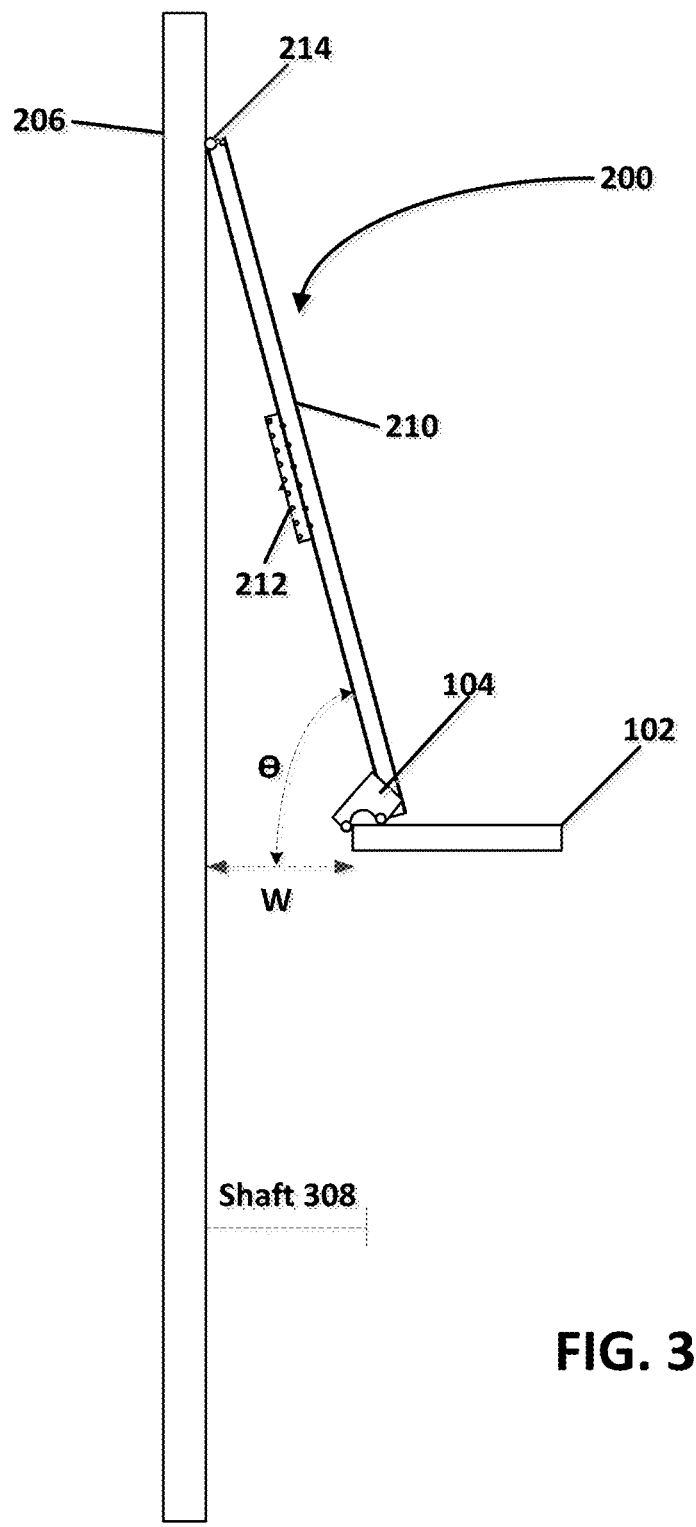
FIG. 3 is a side view of a lean-to rigging apparatus installed in a shaft according to another embodiment of the present disclosure, and forming a different angle with respect to a horizontal axis as compared to FIG. 2.

For example, FIG. 2 and FIG. 3 demonstrate the same rigging apparatus 200 installed in shafts 208 and 308 with differing horizontal distances W. FIG. 2 illustrates a minimum angle $\theta_{min}$ in which the rigging apparatus 200 can connect to a hoisting device and support a load. FIG. 3 illustrates a maximum angle $\theta_{max}$ in which the rigging apparatus can connect to a hoisting device and support a load. The maximum and minimum horizontal distances W between sill 102 and shaft wall 206 corresponding to $\theta_{min}$ and $\theta_{max}$ will depend on the length of the rigging apparatus 200. The range of $\theta_{min}$ to $\theta_{max}$ may correspond to a range of approximately 48° to 67°. The rigging apparatus 200 could be arranged in any of the plurality of angels θ within this range. In one embodiment where the rigging apparatus 200 has a length of 162 inches, the range of $\theta_{min}$ to $\theta_{max}$ would allow for the rigging apparatus 200 to be installed in any of a plurality of shafts with a horizontal distance W ranging from 63.750 to 108.500 inches.

Figure 4:
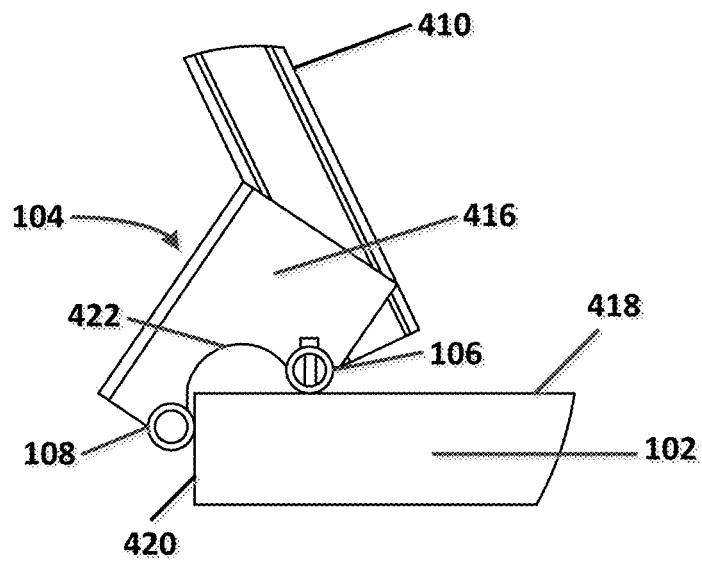
FIG. 4 is a close up view of a sill support structure of a lean-to rigging apparatus seated against a sill according to one embodiment of the present disclosure.

FIG. 4 is a close up view of a sill support structure 104 of the lean-to rigging apparatus from any of FIG. 1-3 seated against a sill 102 according to one embodiment of the present disclosure. The sill support structure 104 comprises a sill support body 416 rigidly connected to the spanning beam 410 (that could be identical to any of the spanning beams in FIG. 1-3), an upper sill support member 106, and a lower sill support member 108. The sill support body 416 of the sill support structure 104 is rigidly connected to the spanning beam 410. Therefore, the sill support structure 104 rotates and seats differently with the sill 102 when the angle θ of the rigging apparatus of FIG. 1-3 is adjusted. That is, the angle θ of the rigging apparatus cannot be changed without changing how the sill support structure 104 seats against the ledge 102.

In one embodiment, the sill support structure 104 is welded to the spanning beam 410. However, the sill support structure 104 could be connected to the spanning beam 110 by any other suitable means, such as adhesives, clamps, or clips sufficient to provide a strong rigid connection. The sill support structure 104 could also be integrally formed with the spanning beam 410. Furthermore, the sill support structure could be constructed using any appropriate shape or material. As illustrated, the sill support structure 104 has a "T" shape. It could have other cross-sectional shapes, such as for example square, rectangular, circular, channel, "H" shape, "L" shape, "T" shape or "W" shape. It can further be constructed out of steel, aluminum, or another sufficiently strong material or materials.

The upper sill support member 106 is configured to abut against a top side of the sill 418. The lower sill support member 108 is configured to abut against a lower side of the sill 420. When both of the sill support members 106 and 108 abut against their respective sides of the sill 102, the sill support structure 104 is securely seated against the sill 102. In such a configuration the sill support structure 104 supports the rigging apparatus of FIG. 1-3 such that the rigging apparatus may connect to a hoisting device and support a load. More particularly, the sill support structure 104 is sufficiently seated against the sill 102 to prevent movement of the rigging apparatus in both a direction generally towards the sill (to the right of the page in FIG. 4) and in a direction along the edge of the sill where sill sides 418 and 420 meet (along an axis into and out of the page in FIG. 4).

In the embodiment illustrated in FIG. 4, the sill support members 106 and 108 are made of a steel pipe having a round cross-sectional shape. The upper sill support member 106 may be slotted to allow for a bolt or other attachment means to be inserted and attached and secured to the underlying concrete or other structure. Sill support members 106 and 108 may be welded to the sill support structure 104 and mounted in a direction perpendicular to the longitudinal axis of the spanning beam 410 and the sill support body 416. However, the sill support members could be connected to the sill support structure 104 by any other suitable means, such as adhesives, clamps, or clips sufficient to provide a strong rigid connection. They could also be integrally formed with the sill support structure 104. The sill support members 106 and 108, like the sill support structure 104, could be made from other desired materials such as, for example, aluminum, and can have other cross-sectional shapes such as, for example, an octagonal cross-sectional shape. In some embodiments, some or all of the surfaces of the sill support members 106 and 108 may have a layer of slip resistant material or have a coating of slip resistant material.

The sill support members 106 and 108 are attached at different points on the sill support structure 104. A recess 422 is formed in the sill support structure 104 and extends between the sill support members 106 and 108. Recess 422 allows the sill support structure 104, and consequently the rigging apparatus as a whole, to be smoothly rotated around sill 102 without catching the edge formed where the top side of the sill 418 and the lower side of the sill 420 meet. This allows the sill support structure 104 to seat against the sill 102 in a plurality of seating positions. The plurality of seating positions of the sill support structure 104 correspond to different angles θ between a horizontal axis (perpendicular to a shaft wall not pictured in FIG. 4 and parallel to the sill 102) and the spanning beam 410, depending on the horizontal distance W between a given sill and shaft wall. In other words, the rigid connection between the spanning beam 410 and sill support structure 104 means that an angle θ made by the spanning beam 410 corresponds to a single position of the sill support structure 104 with respect to the sill 102. This correspondence could depend on the length of a given spanning beam 410 of the rigging apparatus.

FIGS. 2-3 illustrate two different seating positions of the sill support structure 104 with respect to the sill 102. The different seating positions correspond to changes in the angle θ, such as when the same rigging apparatus is installed in a shaft with a different horizontal distance W. The seating position of the sill support structure 104 and how it changes when the angle θ changes will now be described in more detail. When the angle θ is increased, the upper sill support member 106 abuts against the upper side of the sill 418 at a point further away from the lower side of the sill 420. Likewise, the lower sill support member 108 abuts against the lower side of the sill 420 at a point nearer to the upper side of the sill 418. When the angle θ is decreased, the upper sill support member 106 abuts against the upper side of the sill 418 at a point nearer to the lower side of the sill 420. Likewise, the lower sill support member 108 abuts against the lower side of the sill 420 at a point farther away from the upper side of the sill 418. The recess 422 between the sill support members 106 and 108 prevents the edge of the sill from contacting the sill support structure 104 at any angle in the plurality of angles between a $\theta_{min}$ and $\theta_{max}$. No matter the orientation of the sill support structure 104, and consequently the spanning beam 410, the sill 102 only contacts the sill support structure 104 at either or both of the sill support members 106 and 108.

Although the recess 422 is illustrated as having a curved or circular shape, it can have any shape that allows the sill structure 104 to be smoothly rotated through a plurality of angles between $\theta_{min}$ and $\theta_{max}$. Likewise, the sill 102 can comprise shapes other than a rectilinear configuration, such as for example a rounded edge. Although a rounded edge would not have defined sides such as 418 and 420, it is to be understood that the sill support structure 104 could seat against the sill in a generally similar manner as described above with reference to FIG. 4. The sill 102 can further have any desired size or thickness, and the sill support structure 104 could be made to account for the size/thickness of a particular sill 102. In particular, the dimensions of the sill support structure 104 could be adjusted to account for differing thicknesses of the sill.

By using a sill support structure 104 that is rigidly attached to the spanning beam 110, a rigging apparatus 200 is able to be adjusted through a plurality of angles θ based on the size of the shaft without the use of the hinge. Hinged designs similarly allow for movement of a rigging apparatus through a plurality of angles, but require a hinge. The hingeless design according to the present disclosure has the advantage of not including a hinged pivot point. Hinged pivot points can be a structural weak point, and the hingeless design disclosed can be advantageously incorporated to increase the structural strength of the rigging apparatus. Such a rigging apparatus may be capable of supporting increased loads as compared to designs requiring a hinge. A further advantage is that maintenance of a hinge—including lubrication—is not required.

Figure 5:
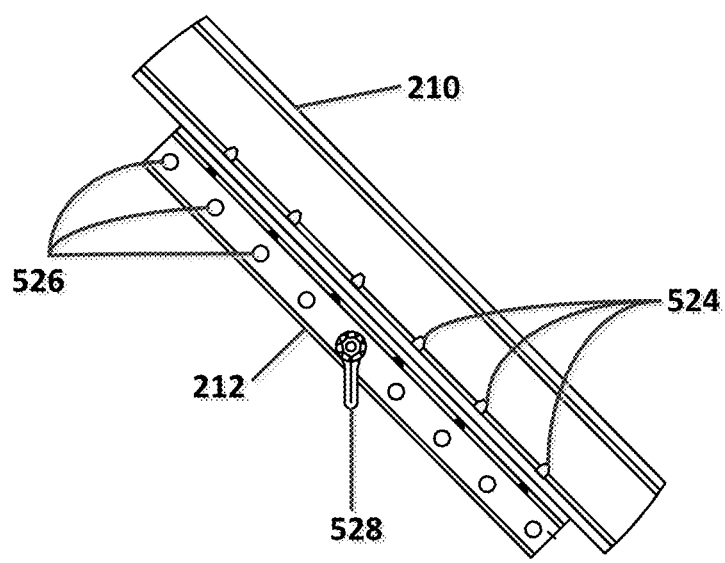
FIG. 5 is a close up view of a hoist connector arranged on a spanning beam of a lean-to rigging apparatus according to one embodiment of the present disclosure.

FIG. 5 is a close up view of a hoist connector 212 arranged on a spanning beam 210 of the lean-to rigging apparatus 200 illustrated in FIGS. 2-3 and according to one embodiment of the present disclosure. Hoist connector 212 is arranged on the lower side of spanning beam 210 and configured to allow the rigging apparatus 200 to be connected to a hoist device (not pictured). In one embodiment illustrated in FIG. 2, the hoist connector 212 is a second "I" beam rigidly connected to the spanning beam 210. The hoist connector 212 may be rigidly connected to the spanning beam 210 by a series of bolted connections 524. However, any suitably strong means of connection could be used, such as for example, a welded connection. As shown in FIG. 2-3, the hoist connector 212 is substantially centered along the longitudinal axis of the spanning beam 210. However, the hoist connector 212 can be positioned at other longitudinal locations along the spanning beam 210. For example, depending on the shape and weight distribution of the load to be hoisted, the hoist connector 212 might be arranged either closer to the first end or to the second end of the spanning beam 210.

The hoist connector 212 can further comprise a plurality of apertures 526 for supporting a load. For example, in another embodiment that is not illustrated, the hoist connector 212 can be formed integral to the spanning beam 210. That is a separate beam is omitted and the apertures 526 are formed integral to the spanning beam 210. The apertures 526 are configured to support a load by engaging with at least one load support 528. As illustrated in FIG. 5, the load support 528 may be a metal connector such as a ring or hook that fits through at least one of the apertures 526. The load support 528 is configured to connect a hoist device (not pictured) to the rigging apparatus 200. For example, a connector such as a rope, metal rope, chain, or strap could be threaded through a load support 528 configured as a ring or hook to connect the rigging apparatus 200 to a hoist device and to a load. The load support 528 could alternatively be one of the connectors mentioned above, and threaded through one or more of the apertures 526. Moreover, additional safety harnesses or safety lines could be connected to the hoist connector 212 for purposes other than hoisting a load.

The apertures 526 can have any shape, such as for example slots, sufficient to allow connection to a load support 528. While the illustrated embodiment includes a quantity of nine apertures 526, it should be appreciated that any quantity of apertures 526 could be used. While the illustrated embodiment shows the apertures 526 as spaced apart an equal distance and centered along the length of the hoist connector 212, it should be appreciated that in other embodiments, the apertures 526 could have any desired spacing and could be positioned at any desired location along the length of the hoist member 202.

Figure 6:
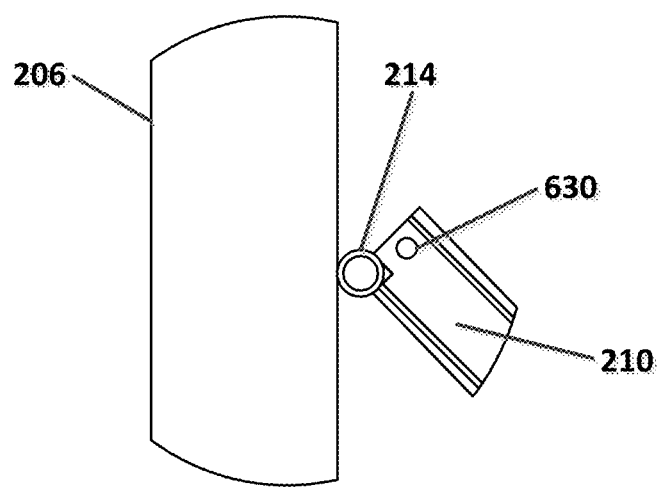
FIG. 6 is a close up view of a wall support member abutting against a shaft wall according to one embodiment of the present disclosure.

FIG. 6 is a close up view of the wall support member 214 of FIG. 2-3, which is attached to the second end of spanning beam 210 and configured to abut against shaft wall 206 to provide support for the rigging apparatus 200. In the illustrated embodiment, the wall support member 214 is made from steel pipe, having a round cross-sectional shape, welded to the spanning beam 210, and mounted in a direction perpendicular to the longitudinal axis of the spanning beam 210. However, the wall support member 214 can be made from other desired materials, such as for example aluminum, and can have other cross-sectional shapes, such as for example an octagonal cross-sectional shape. Additionally, the wall support member 214 can be connected to the spanning beam 210 by other desired methods, such as for example adhesives, clamps, or clips sufficient to rest against the shaft wall 206 and provide support for the rigging apparatus 200 at the resulting angle θ. The wall support member 204 provides support by preventing movement of the rigging apparatus 200 in both a direction generally towards the wall (to the left of the page in FIG. 6) and in a direction parallel to the shaft wall 206 along an axis into and out of the page in FIG. 6. In some embodiments, the outside surface of the wall support member 204 may have a layer of slip resistant material or have a coating of slip resistant material.

Lift aperture 630 is also shown in FIG. 6, and is integrally formed in the spanning beam 210. This aperture can be used to connect the rigging apparatus 200 to a lift line to be itself hoisted into position in a shaft. It is advantageous to use the lift aperture 630 instead of the apertures 526 shown in FIG. 5 for hoisting the rigging apparatus 200 into position because when hoisted via aperture 630, the rigging apparatus naturally takes a vertical position in the shaft. This allows the rigging apparatus 200 to be lifted with minimal opportunity for collisions with the walls of the shaft such as shaft wall 206. It could also be used to connect to safety lines, harness lines, or other similar connections in a similar manner to the apertures 526 in FIG. 5.

Figures 7, 8:
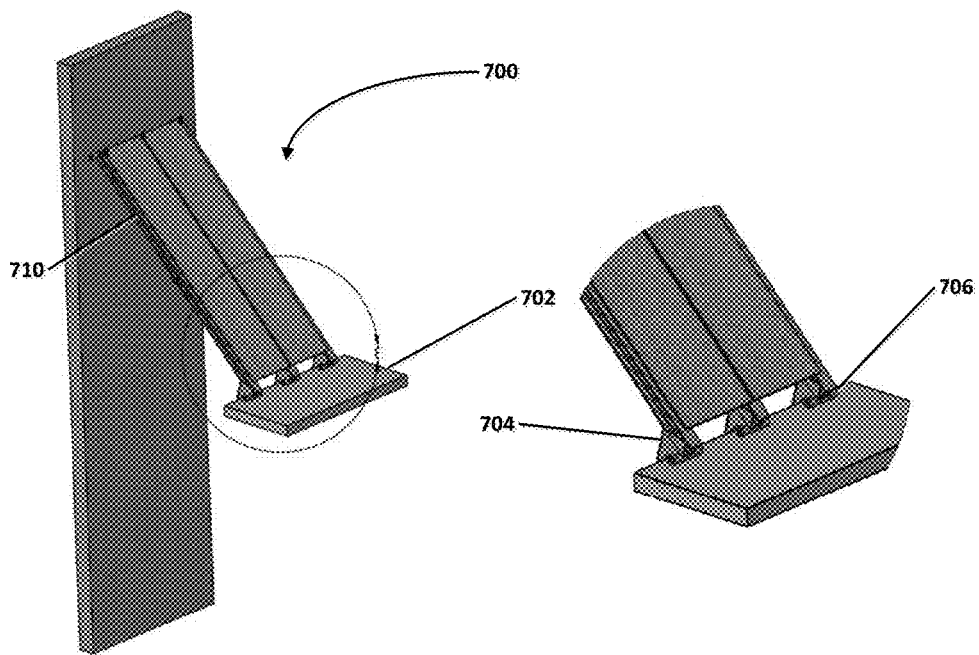
FIGS. 7 and 8 are perspective views of one embodiment of a lean-to rigging apparatus for installation into a shaft and showing the sill support structure seated against a sill.

FIGS. 7 and 8 illustrate another embodiment of a lean-to rigging apparatus 700 for installation and use within a shaft, in accordance with the present disclosure. The rigging apparatus 700 is configured to seat against sill 702 that is within the shaft. Sill 702 may, for example, be a portion of the floor of a building where the floor intersects with an elevator shaft. In the embodiment illustrated in FIGS. 7 and 8, the sill support structure 704 of the rigging apparatus 700 seats against two different sides of sill 702 that form a corner. However, the sill 702 need not have a rectilinear shape and can comprise other shapes such as, for example, a rounded edge. The sill 702 can also have any desired size or thickness.

The rigging apparatus 700 further comprises a spanning assembly 710 comprising three beams having a first end, a second end, and a length, and plywood or other structure filling in the space between the beams. Sill support structure 704 is rigidly attached to the first end of the spanning assembly 710 and configured to seat against the sill 702 and provide support for the rigging apparatus 700 and maintain the spanning beam 710 at a constant angle. Also illustrated is the upper sill support member 706.

In addition to the embodiments discussed above, it may be appreciated that there are various alterations, modifications, and improvements. For instance, the specific choice of materials with respect to the various components are within the ability of those skilled in the art according to the application, based on the functional indications given above. The specification and drawings are, accordingly, to be regarded in an illustrative rather than a restrictive sense. It will, however, be evident that various modifications and changes may be made thereunto without departing from the broader spirit and scope of the invention.

What is claimed:

1. A lean-to rigging apparatus comprising:
   a spanning beam having a first end, a second end, and a length measured from the first end to the second end;
   a sill support structure rigidly attached to the first end of the spanning beam in a fixed position, the support structure including a first sill support member, a second sill support member, and a recess that extends between the first sill support member and the second sill support member such that the sill support structure is configured to abut a first surface in a plurality of positions;
   a wall support member attached to the second end of the spanning beam and configured to abut against a second surface that is opposite the first surface; and
   at least one hoist connector arranged on the spanning beam, wherein the hoist connector is configured to allow a connection to a hoist device;
   wherein:
      the length of the spanning beam is longer than a horizontal distance measured from the first surface to the second surface along a direction substantially perpendicular to the first surface,
      the apparatus is configured to define an angle measured from the spanning beam to the direction when the sill support structure abuts the first surface and the wall support member abuts the second surface, and
      the angle is one of a plurality of angles at which the spanning beam is configured to be oriented with respect to the direction, the plurality of angles corresponding to the plurality of positions of the sill support structure.

2. The lean-to rigging apparatus of claim 1, wherein:
   the apparatus is configured to be installed in a shaft, the first surface is a wall of the shaft, the second surface is a sill of the shaft, the sill including an upper portion and a lower portion,
   the direction is a first direction and the upper portion is spaced from the lower portion in a second direction that is perpendicular to the first direction, and the first sill support member configured to abut against the upper portion of the sill, and the second sill support member configured to abut against the lower portion of the sill.

3. The lean-to rigging apparatus of claim 2, wherein one or more of the first sill support member, second sill support member, and wall support member are elongate along a third direction that is direction that is perpendicular to both the first direction and the second direction.

4. The lean-to rigging apparatus of claim 2, wherein one or more of the upper sill the first sill support member, second sill support member, and wall support member have a layer of slip resistant material or have a coating of slip resistant material.

5. The lean-to rigging apparatus of claim 2, wherein the first and second sill support members each include a steel pipe having a substantially round cross-sectional shape.

6. The lean-to rigging apparatus of claim 5, wherein the first and second sill support members are welded to the sill support structure.

7. The lean-to rigging apparatus of claim 5, wherein the first and second sill support members are integrally formed with the sill support structure.

8. The lean-to rigging apparatus of claim 1, wherein for each position in the plurality of positions of the sill support structure, the first sill support member abuts against the upper portion of the sill in a different position and the second sill support member abuts against the lower portion of the sill in a different position.

9. The lean-to rigging apparatus of claim 1, wherein the recess prevents the sill from contacting the sill support structure at any point other than at the first and second sill support members.

10. The lean-to rigging apparatus of claim 1, wherein the hoist connector includes a beam rigidly attached to a lower side of the spanning beam, and wherein the hoist connector further comprises one or more apertures.

11. The lean-to rigging apparatus of claim 10, wherein the hoist connector is substantially centered between the first end and the second end of the spanning beam.

12. The lean-to rigging apparatus of claim 10, wherein the hoist connector is connected to one or both of a hoist device and a load.

13. The lean-to rigging apparatus of claim 10, wherein the one or more apertures comprise a plurality of apertures equally spaced along the hoist connector.

14. The lean-to rigging apparatus of claim 10, wherein the hoist connector is integrally formed with the spanning beam such that the one or more apertures are integrally formed in the spanning beam.

15. The lean-to rigging apparatus of claim 10, wherein the hoist connector is bolted to the spanning beam.

16. The lean-to rigging apparatus of claim 10, wherein the hoist connector is welded to the spanning beam.

17. The lean-to rigging apparatus of claim 1, wherein the wall support member includes a steel pipe having a substantially round cross-sectional shape.

18. The lean-to rigging apparatus of claim 17, wherein the wall support member is welded to the spanning beam.

19. The lean-to rigging apparatus of claim 1, wherein the wall support member is integrally formed with the sill support structure.

20. The lean-to rigging apparatus of claim 1, wherein the spanning beam has a cross-sectional shape, the shape being one of a tube, an "I" square tube, "H" shape, "L" shape, "T" shape, "W" shape, rectangular tube, square, rectangular, circular, or channel.

* * * * *

UNITED STATES PATENT AND TRADEMARK OFFICE
CERTIFICATE OF CORRECTION

PATENT NO. : 10,024,491 B2
APPLICATION NO. : 15/195929
DATED : July 17, 2018
INVENTOR(S) : Morgan Knickrehm It is certified that error appears in the above-identified patent and that said Letters Patent is hereby corrected as shown below:

On the Title Page

First Column:
Please replace
Assignee: Safewworks, LLC
With
-- Assignee: SafeWorks, LLC Signed and Sealed this
Ninth Day of October, 2018

Andrei Iancu
*Director of the United States Patent and Trademark Office*